(12) United States Patent
Maillot

(10) Patent No.: US 6,525,735 B1
(45) Date of Patent: Feb. 25, 2003

(54) SYSTEM FOR ATTACHING RIGID OBJECTS TO DEFORMED SHAPES IN COMPUTER GENERATED IMAGES VIA REAL TIME LOCAL APPROXIMATION OF DEFORMATION USING ROTATION

(75) Inventor: Jerome Alain Maillot, Toronto (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/553,385

(22) Filed: Apr. 20, 2000

(51) Int. Cl.[7] ............................................. G06T 17/60
(52) U.S. Cl. ...................................... 345/473; 345/474
(58) Field of Search ................................ 345/418, 426, 345/473, 474, 528

(56) References Cited

PUBLICATIONS

A. Barr. Global and local deformations of solid primitives. Proc. of SIGGRAPH, Computer Graphics, 21–30, 1984.
D. Baraff et al. Dynamic simulation of non–penetrating flexible bodies. Computer Graphics, 26:303–308, 1992.
D. Baraff et al. Large steps in Cloth Simulation. Proc. of SIGGRAPH, Computer Graphics, 43–45, 1998.
T. Beier et al. Feature–Based Image Metamorphosis. Computer Graphics, 26:2, Jul. 1992.
G. Celniker et al. Deformable curve and surface finite elements for free form shape design. Computer Graphics, 25:257–266, 1991.
J. Chadwick et al. Layered construction for deformable animated characters. Computer Graphics, 23(3):234–243, 1989.
S. Coquillart et al. Extended free form deformations: A sculpting tool for 3D geometric modeling. Computer Graphics, 24(4):187–196, 1990.
J. Hahn. Realistic animation of rigid bodies. Computer Graphics, 22(4):299–308, 1988.
Hsu et al. Direct manipulation of free–form deformations. Computer Graphics, 26(2):177–184, 1992.
J. Kent et al. Shape Transformation for Polyhedral Objects. Proc of SIGGRAPH, 47–54, 1992.
R. MacCraken et al. Free form deformations with lattices of arbitrary topology. Computer Graphics, 181–189, 1996.
P.G. Maillot. Using quaternions for coding 3D transformations, Graphic gems I, p. 498, Academic Press Inc., 1990.
E. Raible. Matrix Orthogonalization. Graphic gems I, p 464, Academic Press Inc., 1990.
T. Sederberg et al. Free–form deformation of solid geometric models. Computer Graphics, 20:151–160, 1986.
K. Singh et al. Wires: A geometric deformation technique. SIGGRAPH 98, 405–414, 1998.
T. Terzopoulos et al. Elastically deformable models. SIGGRAPH 87, Proc. of Computer Graphics, 21(4):205–214, 1987.
D. Terzopoulos et al. Modeling inelastic deformation: visco–elasticity, plasticity, fracture. SIGGRAPH 88, Proc. of Computer Graphics, 22(4):269–278, 1988.
J. Weil. The synthesis of cloth objects. SIGGRAPH 86, Proc. of Computer Graphics, 20(4):49–54, 1986.

*Primary Examiner*—Cliff N. Vo
(74) *Attorney, Agent, or Firm*—Staas & Halsey

(57) ABSTRACT

The present invention is a system that produces a position of a rigid object, such as a button, on a deformed model, such as an animated piece of cloth, at each cycle in an animation of the model by isotropically finding a linear approximation of the deformation at the model and finding a rotation of the object allowing attachment of the object to the model. The system removes shear and scaling from a linear transformation of an average deformation of the model. A volumetric area of the deformed model in which the object will reside and which is used for the position determination is specified essentially as a mapping of the object onto the model. The average deformation of the area is calculated and the linear transformation of the object is performed with the average deformation. In finding the rotation a rotation characteristic matrix is created and Eigen vectors or directions are extracted and correspond to the rotation.

18 Claims, 11 Drawing Sheets

SYSTEM FOR ATTACHING RIGID OBJECTS TO DEFORMED SHAPES IN COMPUTER GENERATED IMAGES VIA REAL TIME LOCAL APPROXIMATION OF DEFORMATION USING ROTATION

BACKGROUND OF THE INVENTION

1. Field of the Invention

The present invention is directed to a system for attaching a rigid object to a deformable model and, more particularly, to a system that uses the average deformation to position the object on the model.

2. Description of the Related Art

The present invention provides an efficient way to attach rigid objects, or rigid areas to deformed or deformable shapes. Several types of deformations have been proposed in the last decade. Cartoon like non-linear deformations use linear transformation with variable coefficients. Free Form Deformations and their extensions are volumetric spline based. Axis or curve based deformations have also been introduced. All these methods ultimately define a deformation field from $R^3$ to $R^3$ that will be used as input for the algorithm of the present invention.

Physically based deformations models and more specifically cloth deformations work on sampled solids or surfaces. The deformation is only known at some specific vertex position.

So far, most articles dealing with rigid object animation use a physically based model. The user defines forces and behavior, then some engine computes the animation. While this method is suited for complex realistic motion, it is hard for artists to control the result, or break the physical realism to give more emotion to the animation. This situation happens often in the animation process, and no tool is currently available to easily solve this problem.

What is needed is a direct approach, where users will benefit from the wide range of existing deformation tools, while adding minimal interaction or computation overhead, to determine the animation of the rigid parts.

SUMMARY OF THE INVENTION

It is an object of the present invention to provide an efficient way to attach rigid objects, or rigid areas to deformed shapes.

It is also an object of the present invention to allow rigid objects to be animated with deforming shapes.

It is an additional object of the present invention to allow animation of rigid objects by having them fly into a three-dimensional deforming field, such as modeling wind using a procedural model and using the average local air deformation to compute the rigid object position and orientation.

The above objects can be attained by a system that produces a position and an orientation of a rigid object connected to a deformed two or three-dimensional model at each cycle in an animation by performing isotropic removal of shear and scaling from a linear transformation of an average deformation of the model. A volumetric area of the deformed model which is used for the position determination is specified. The average deformation of the area is calculated and the linear transformation of the object is performed with the average deformation.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Additional realism can be achieved in computer generated images using smooth and increasingly complex deformations. Though significant effort has been spent on improving these deformations, no general method has been proposed yet to deal with rigid pieces connected to soft objects or deformable models.

The present invention provides a framework to solve this problem. The discussion herein will present several types of applications, such as flowing small objects in a deformation field, animating rigid features connected to some deformed object, or smoothly attached limbs to a deforming body.

All the calculations presented here can be applied to any type of deformation, provided that the deformation at each point only depends on the point itself. Even though the invention can directly compute the result for some analytical deformation fields, the discussion will show that a good sampling of the deformation in the area of interest is generally enough.

One intermediate result comprises a practical method to find the best rotation that approximates a linear transformation. The present invention supercedes the Gram-Schmidt orthonormalization process. Using the present invention obtains the Gram Schmidt result in the limit, when using weights 0, 1, infinity. In practice, using 0, 1, 1000 is close enough to Gram-Schmidt, that human eye can't distinguish them. Gram-Schmidt cannot be extended to produce the results described here with more isotropic weights, like 1, 1, 1. The present invention method is much easier to compute than global methods based on Taylor series. A Taylor series is also only an approximation, the present method is exact. A Taylor series does not allow any control on the quality of the result, the method here does that, through the use of weights.

The discussion will first describe a preferred embodiment of the hardware used in the invention. Next will be discussed the mathematical framework that will be used throughout the discussion. The discussion will describe the two operation process of the invention of first finding a linear approximation of the deformation and then finding the best rotation. A detailed discussion will be provided which focuses on extracting the rotation information from a matrix rotation characteristic matrix as Eigen directions as well as a discussion of how this relates to the Gram-Schmidt method. The final result is a direct formula, which is always valid, and thus more efficient and general than global methods. The next section will describe an efficient way to determine the best linear transformation that approximates a given deformation around a certain location. This will be followed by an explanation of the problems of a smooth interpolation between rigid and deformed parts of a single object, and a description of the simple approach used in this invention. Finally, a discussion will be provided of three different situations where the algorithms discussed herein are typically used.

Figure 1:
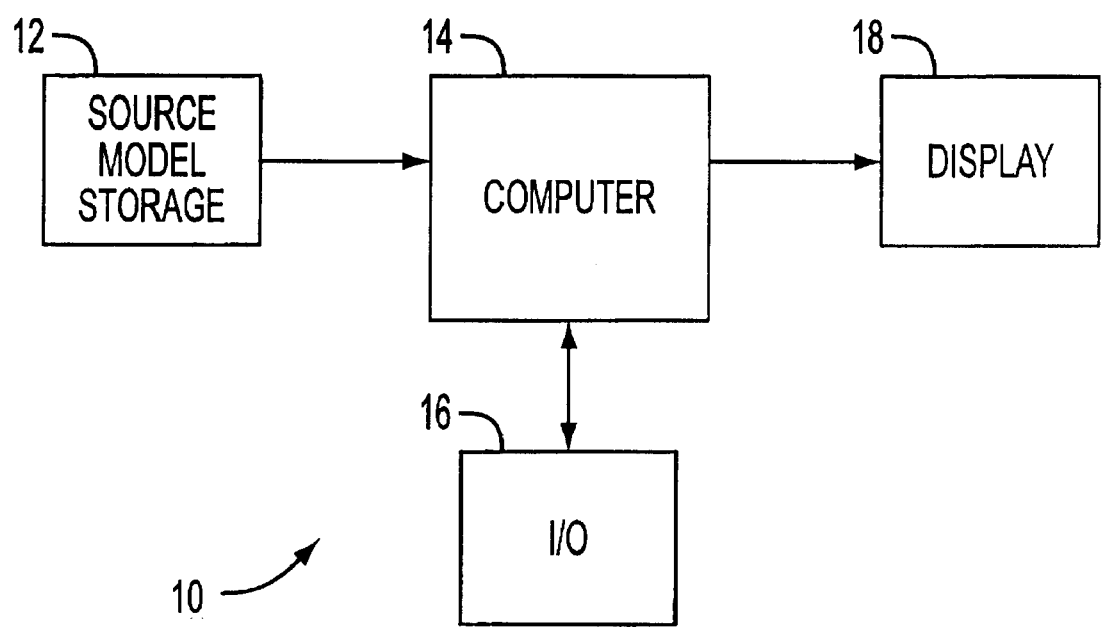
FIG. 1 depicts hardware components of the present invention.

The present invention is implemented in a system 10, such as depicted in FIG. 1, where a source model, such as a model of a piece of cloth, which can be available in a storage device 12, such as a hard disk, is provided to a conventional computer 14, such as an R5000 $O^2$ workstation available from Silicon Graphics, Inc. An animator (not shown) interacts through a conventional I/O device 16, such as a keyboard, stylus pad, etc. with the source model presented on a conventional display 18 to design and place an object model of a rigid object, such as a button, on the source model. The computer 14 then performs the operations discussed herein to animate the source model while also animating the object model in a correspondingly appropriate way and displays the resulting animation on the display 18.

Figure 2:
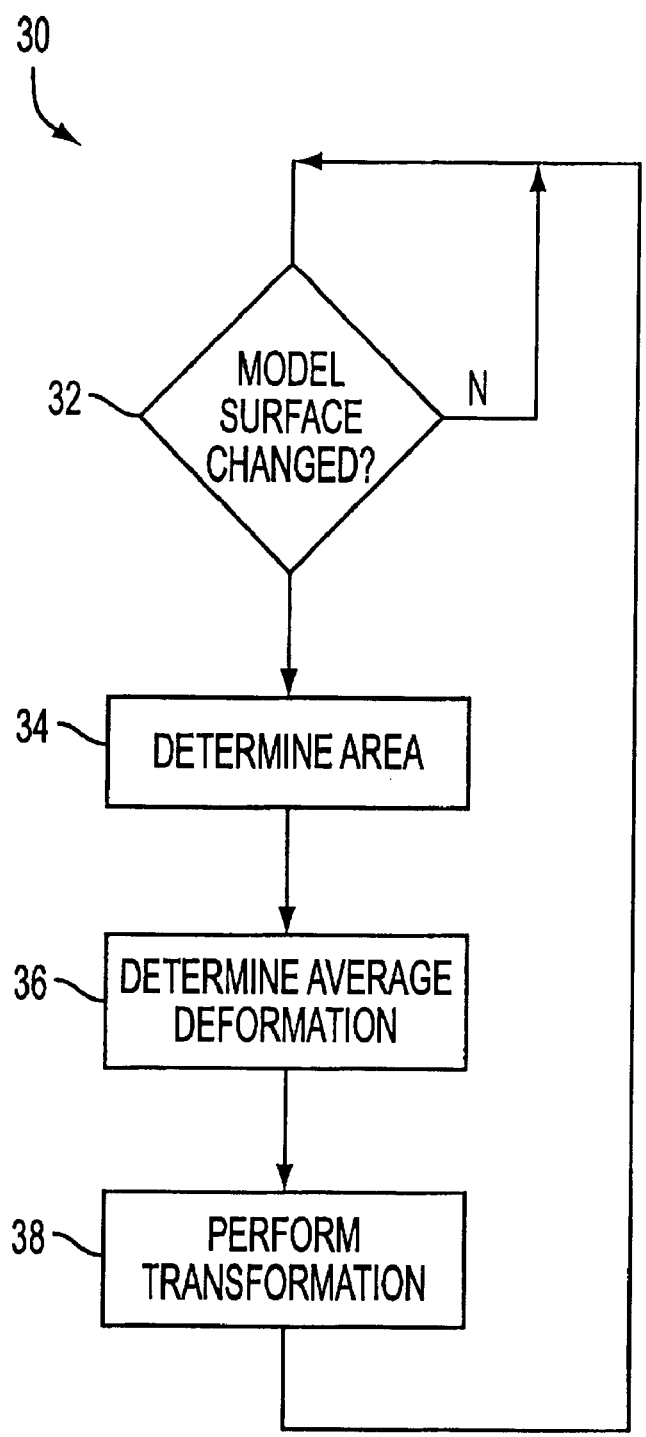
FIG. 2 shows the operations performed in the present invention.

In performing the operations on the rigid object relative to the deformable model at each point in the animation where the surface of the model has changed in the area of the object, the present invention performs several different operations as depicted in FIG. 2. As shown, the process 30 first determines 32 whether the source model surface has changed at this point in the animation. Next, the system determines 34 which portion (or contact set) of the source model to use in determining how the object should move. For example, if the model is the ocean and the object is a small pleasure boat, the contact set is smaller than if the object is an ocean liner. The contact set (volume, surface or area, cloud of points, etc.) can either be determined automatically, using a standard intersection algorithm, or specified interactively by the user. Once the area to use is determined, the average deformation for the area is determined 36. For example, in the example discussed above, if the ocean is relatively calm the average deformation is small while if the ocean is storm tossed the average deformation may be large. This average deformation is then used to perform 38 a displacement of the object into it's proper position and orientation on the deformed model. This operation includes the isotropic removal of shear and scaling from the linear transformation of the average deformation. For example, the removal of shear and scaling keeps the car in FIGS. 3a and 3b from being stretched vertically. The details of these operations will be discussed in more detail later herein. Notations.

The discussion herein will use italic capitals, like F for deformation fields, that is, functions defined on a subset of $R^3$ onto another subset of $R^3$. Capital letters will be used for matrices and vectors, like M or P. The corresponding lower case letter will be used for each matrix or vector element: $M=[_{ij}]$, and $P=[p_i]$. The transpose of a matrix will be noted as $M^T$, and $P \times Q$ will represent the usual $R^3$ cross product. The discussion herein will use three different dot product notations: $P \cdot Q$ is the standard $R^3$ dot product; $M \cdot N = \Sigma_{ij} m_{ij} n_{ij}$ the usual dot product on matrices, considered as $R^9$ vectors. Finally, $F \odot G$ will be used for the weighted $L_2$ dot products on functions (see, for example, formula 2 in the Appendix).

Defining a Distance Between Deformations

To determine the best rotation R that matches a given deformation field F, the discussion will start by addressing the problem of defining precisely a distance between functions. This distance measures the closeness of the rotation and the deformation. There are potentially a number of possible distances, and the one that corresponds to the visual impression of the difference of objects transformed with one or the other function is the one that is chosen.

Figure 3A:
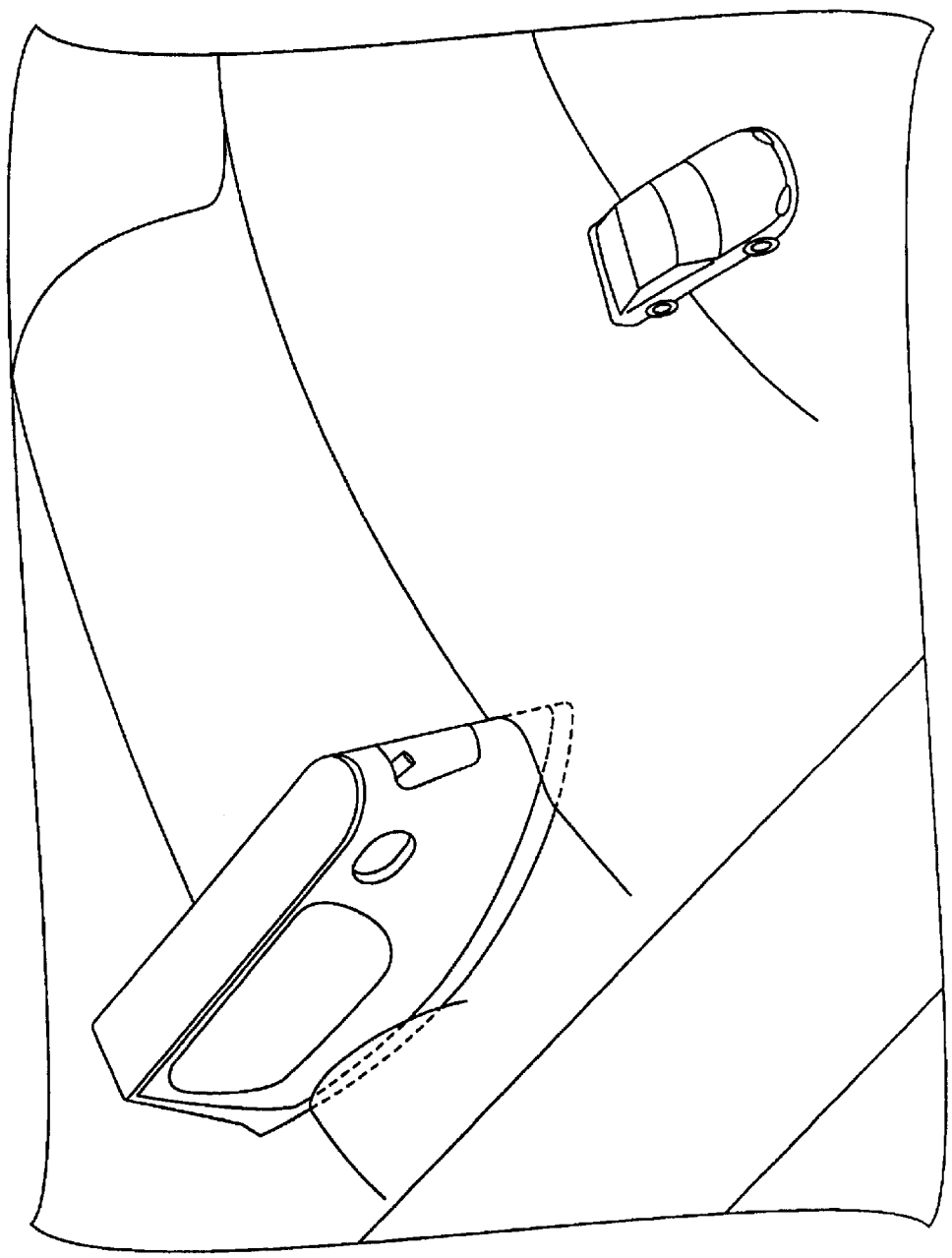
FIGS. 3a–3d depict a deforming model and rigid objects being animated therewith.
Figure 3B:
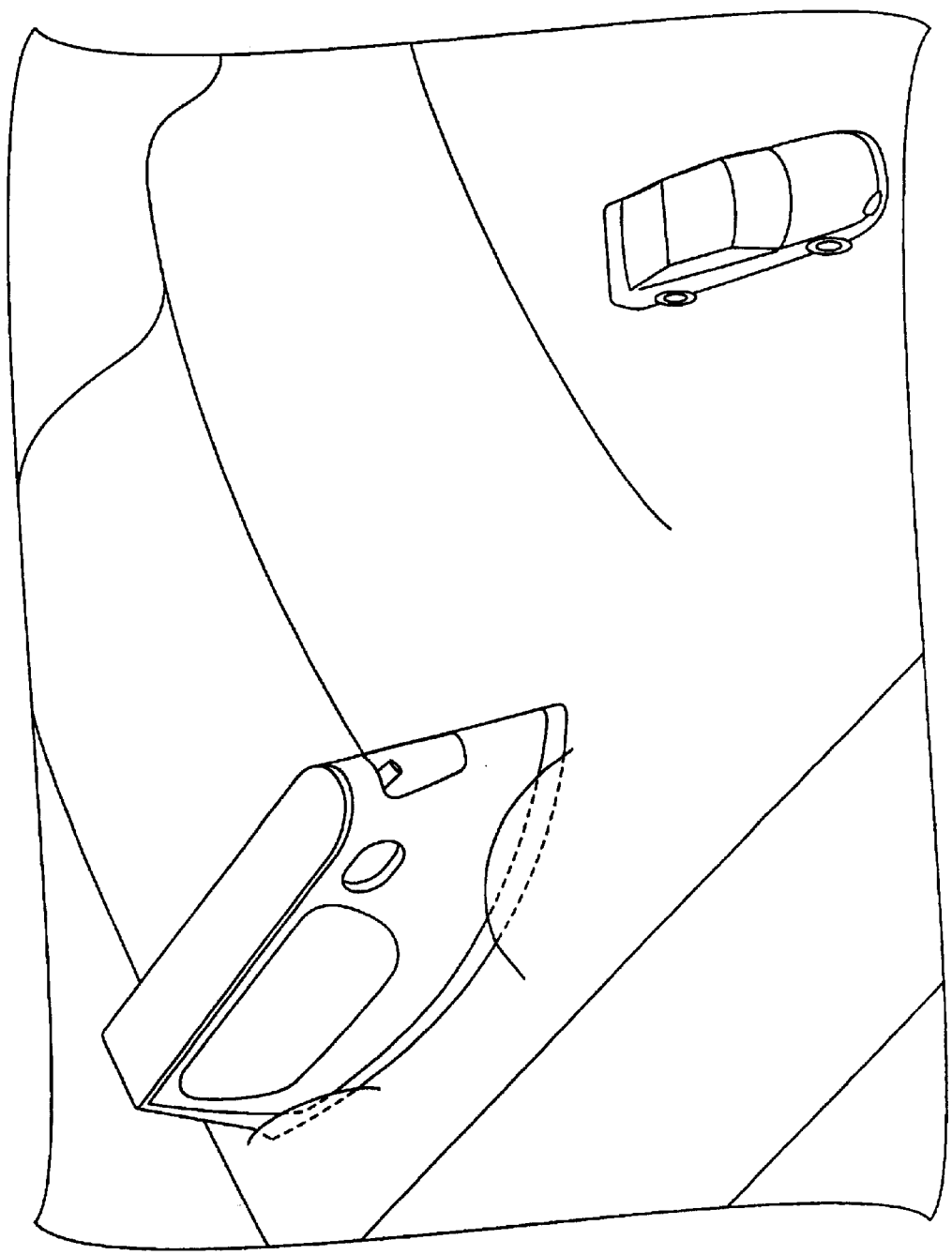
Figure 3C:
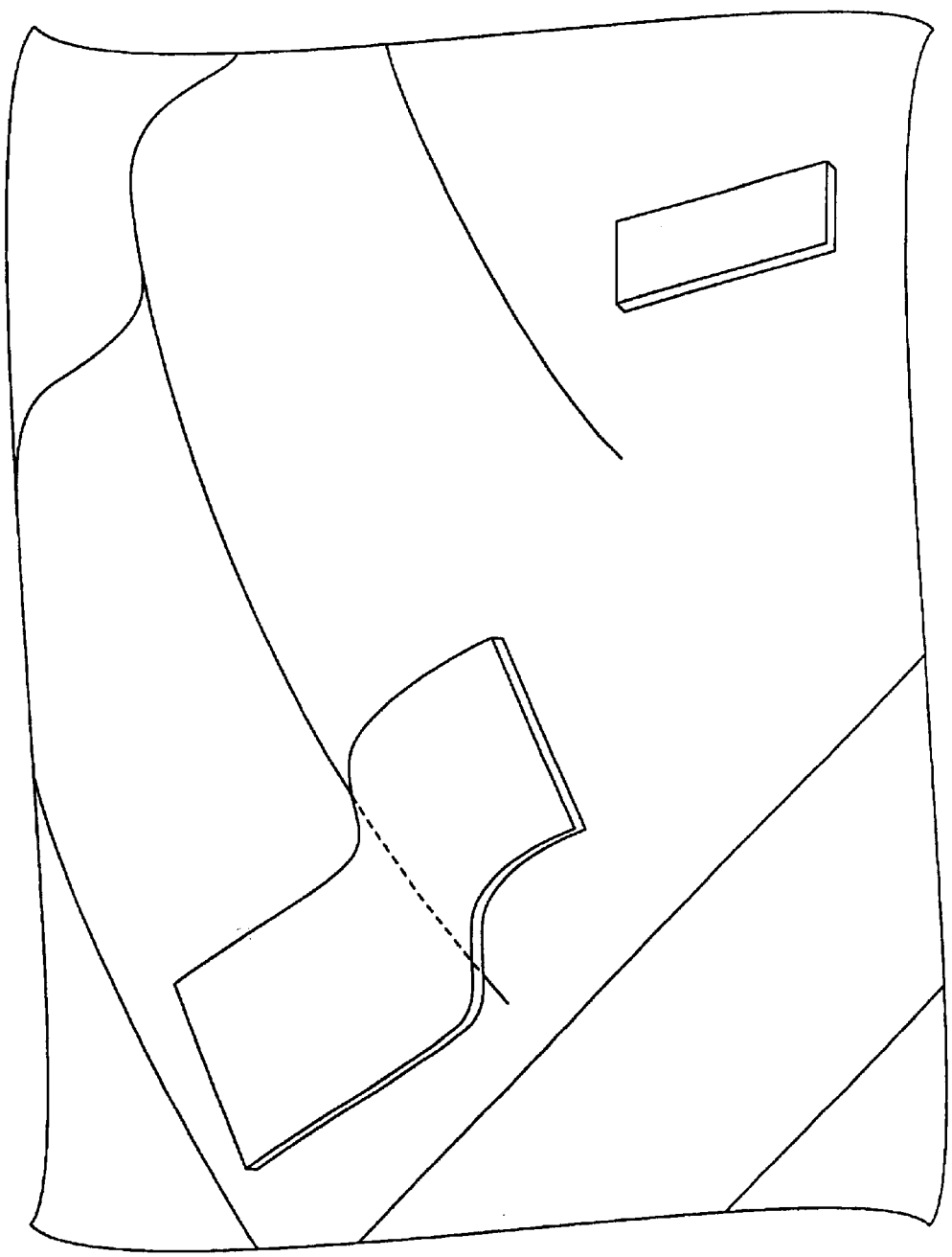
Figure 3D:
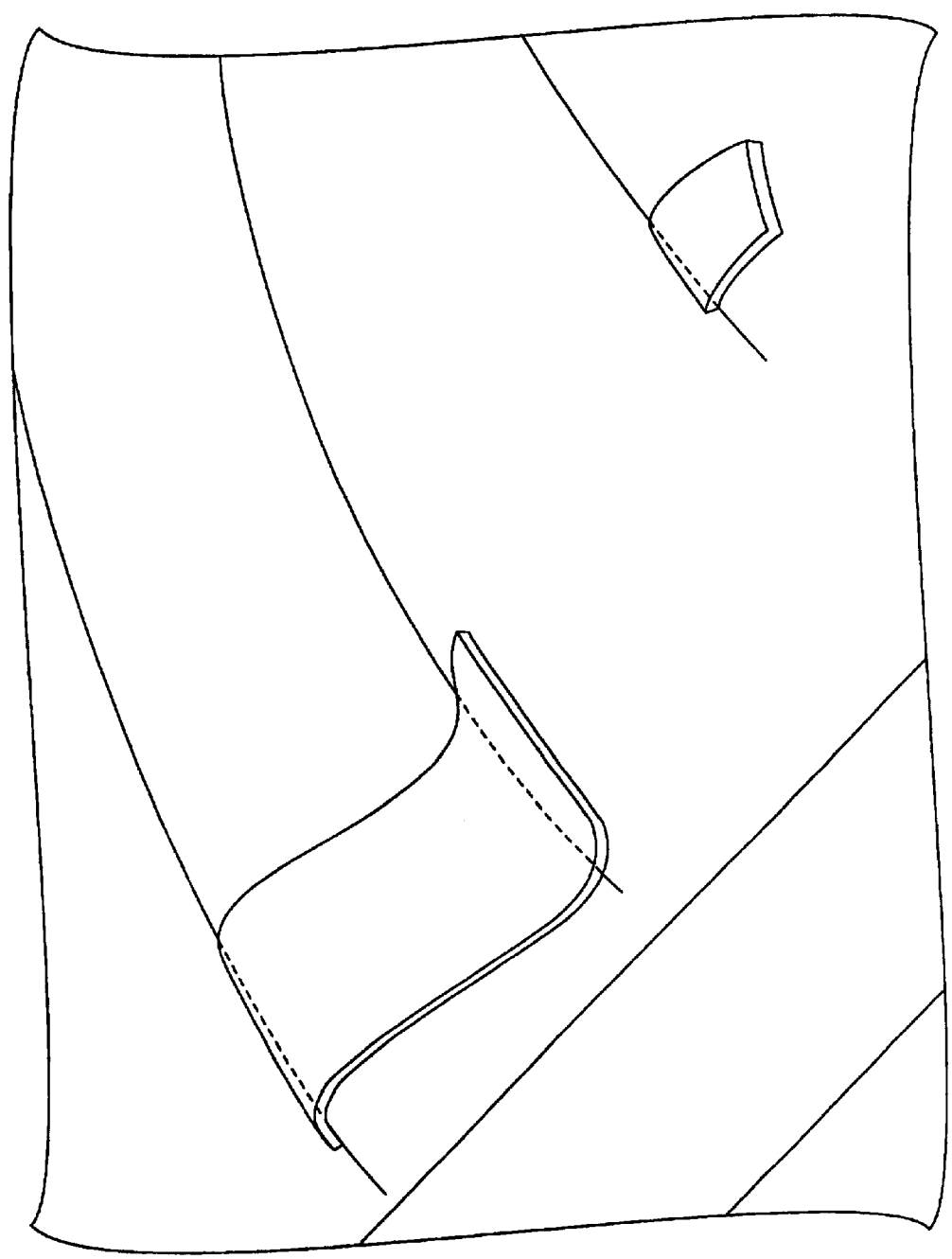

In real situations, users will generally expect some local approximation. If we want to animate rigid objects from a deformation field, as shown in FIGS. 3a–3d, only the area around the specified object is meaningful. FIGS. 3a and 3b show a wave passing large and small objects with a correspondingly large and small area (or contact sets) as shown in FIGS. 3c and 3d. As can be seen, the bigger the contact set results in more averaging and less rotation (the smaller object is rotated by the wave more than the larger object as one would expect). If we deal with a rigid object attached to another deformed one, as discussed later herein, or a rigid part of deformed object also as discussed later herein, the contact set should only take into account the volume that is close to both pieces. This is generally desired and can be achieved automatically with the default settings. However this is not a restriction and users can override the default settings for special effects by defining manually any contact set.

In all cases, a contact set S can be defined that is the location where the rotation and the deformation field are compared. One needs to notice that S is generally a volume, but can also be restricted to a surface or even a set of sample points. This will be the case when the rigid object is at the boundary of the deformed one, like a button on a piece of cloth (or when the deformation is only known at some sample points, like in a physical simulation). It may also be useful to use the surface of the rigid object as the contact set, instead of the whole volume. This can be a way to take into account only the visible effect of the deformation, and get rid of potentially nasty invisible deformation behavior inside the object.

In some situations, like physical simulations, the deformation is only known at the object surface, or even just at some point samples. S will then be contained within the deformation function domain. All examples discussed later use a discrete set for S.

Let's call F and G the deformation fields we want to compare. It seems reasonable to define the distance as the average distance between points P transformed respectively with F and G. For the sake of generality, we introduce a positive weight function w(P) defined over S that will let users give more importance to certain areas and directions, in particular where the user selectable weights allow the user to control isotropism with perfect isotropism resulting when w(P)=1. The distance is then as set forth in equation 1 in the Appendix, where $|S|=\int_P w(P)dP$ represents the weighted volume of S. If S is a true volume, we have a triple integral in the equation. This reduces to a double integral for a flat contact set; or even a simple sum, when S is a discrete set of points. It is important to notice that $d_s(F,G)$ is actually a squared norm for functions defined on S, and that this norm derives from the o dot product as shown in equation 2 of the Appendix.

Best Translation for a Deformation

The best translation which matches the deformation F can be computed as discussed below. It will also be discussed in this section that this is also the translation part of the best affine approximation of F.

Let's call C and C' the weighted center of S, and the deformed set. By taking a constant translation t to approximate F in equation (1), it can be seen that C has a value as shown in equations 3–5 of the Appendix. This is a simple quadratic equation, which is minimal when the translation is the average displacement: t=C'−C.

To simplify the calculations, it can be assumed that C is the origin of the coordinate system. The distance between F and some affine transformation $G(P)=MP+t$ is then as set forth in Appendix equation 6.

The integral k does not depend on t. Also, the previous term vanishes, because C is the coordinate system origin. This shows that $t=C'$ is always the best translation, and does not depend on the M value.

In the rest of this discussion, it will be assumed that this translation value vanishes. This can be achieved by using a normalized deformation field, $F=F-C'$, and adding the translation as a post process. As a result, the invention will be able to focus only on the linear part of the approximation.

Even though the results may not be completely intuitive, all the formula below are valid, even if the best translation as defined above is not picked. This be useful for certain applications where the position of a specific point is imposed.

Distance Between Matrices

In the next sections, a measure of the distance between a general matrix M and a rotation R will be made. In this specific situation, the previous formula can be simplified as shown in Appendix equation 7.

The matrix $(M-R)^T(M-R)$ is a quadratic function of the $\alpha_{ij} = m_{ij} - r_{ij}$ coefficients. It does not depend on point P. So, after integration, the distance $d_S(M,R)$ is a quadratic form of $\alpha_{ij}$. The coefficients of this form only depend on the volume S and the weight function w. They can be computed using the $[\delta_{ij}]$ matrices, formed of zeros everywhere, and 1 in the i,j location, and computing all the possible dot products as shown in equation 8 where $p_i$ is x, y, or z coordinate. Let's call $\alpha_{ij}$ the integral values that define the metric, $M \odot N$ is the dot product that corresponds to the distance being defined as shown in Appendix equations 9 and 10 where $m_j$, and $n_i$ are the $j^{th}$ and $1^{th}$ row vectors of matrices M and N associated with the usual $R^3$ dot product.

One interesting situation happens when set S and weight w are symmetrical according to the coordinates planes. In this case, all $\delta_{ij}$ vanish, if $i \neq j$. When this is the case, the $[\delta_{ij}]$ matrices are orthogonal to each other with respect to our dot product $\odot$. If we call $A=M-R$, and $a_i$ rows of A, then $d_S(M,R)$ only depends on the three $\|a_i\|^2$ values.

If S and w are also invariant by any x, y, and z permutations, then the three $\alpha_{ii}$ values are the same, our distance is proportional to the usual $L_2$ norm on the matrices of equation 11.

While this will not be used here, this property is dimension independent, and justifies why the squared sum of coefficients is generally an appropriate norm on matrices.

Those two symmetry properties are satisfied for example when S is a cube or a sphere, and w(P) is 1 everywhere.

Closest matrix and closest rotation relationship

To find the closest rotation R to a specific deformation F, it will be shown that we can use the closest matrix M as an intermediate step.

Let's call M the matrix that minimizes distance to the given deformation function F. For all matrices $M' \neq M$ we can write equation 11A of the Appendix.

Let's call $u=M'-M$, and $a=u \odot (M-F)$. Then, for every number $\lambda$ equation 12 of the Appendix applies. If $u \odot u \neq 0$, we take $\lambda = /u \odot u$, we then have equation 12B. If $u \odot u \neq 0$, using $\lambda = -/u \odot u$ gives equation 12C.

As M is the closest matrix to F, we must have $\alpha_2 \leq 0$ which is only possible if $\alpha=0$. So, in particular, for every possible rotation matrix R, we can write equation 13 of the Appendix which proves that R is the closest rotation to F if and only if it is the closest to M. This justifies the proposed two step approach, described below.

Extraction of Rotation from a Linear Transformation

Closest rotation to a linear transformation

Given a matrix M, we look for the rotation R matrix that minimizes $d(R,M)=(M-R) \odot .(M-R)$ as set forth in equation 14 of the Appendix.

The second line comes from the well known property that a rotation matrix is orthonormal, and equation 10. This shows that R can be found by looking at the maximum value of $M \odot R$. Once again, this result is dimension independent, though this will not be used in this discussion.

Let's use the conventional quaternion representation of rotation matrices: given a unit quaternion $q=(x, y, z, w)$, such as $x_2+y_2+z_2+w_2=1$, the corresponding rotation matrix $R(q)$ is set forth by matrix equation 15.

Given the constraint that q represents a unit quaternion, the solution R is such that the gradient $\nabla_q (M \odot R(q))$ is orthogonal to the unit sphere $S_3$ in $R^4$; this is equivalent to saying that the gradient is proportional to q as shown in equation 16 of the Appendix.

Each coefficient in the rotation matrix of formula 15 is a quadratic form so the gradient $\nabla_q R$ is a linear application from $R^4$ to $R^9 \times R^4$. As $\odot$ is a dot product, the function $R \mapsto M \odot R$ is linear. This proves that the gradient defined in (16) is a linear function of q. We already know that we will be able to find a 4×4 matrix M such as $\nabla_q(M \odot R)=Mq$.

Solving equation (16) is equivalent to finding the Eigen vectors of M. Complete calculation shows that M is symmetrical, which ensures that M can be diagonalized, and thus always has Eigen vectors. Practical methods for solving this problem can be found in the prior art.

Deriving equation (15), we can find the relationships shown in equations 17–20 of the Appendix.

Let's call $\alpha_i$ the $i^{th}$ row of $[\alpha_{ij}]$, $m_j$ the jth column of M, $\beta_i^j = \alpha_i . \overline{m_j}$ all the possible dot products. We can find after a few calculations that M is equal to the value of the rotation characteristic matrix of equation 21 in the Appendix.

Even though we give here the most general formula, one can remark that the $[\alpha_{ij}]$ matrix is symmetrical, and thus that there is an orthonormal base, in which this matrix is diagonal. This means that every dot product in the formula above can be replaced with a single multiplication in this base. As the orthogonal base does not depend on M, it might be preferable to find this base first if several input matrices have to be computed.

In particular, if the $[\alpha_{ij}]$ matrix is proportional to the identity, for example if S is a sphere, then M is proportional to a simpler matrix of equation 21A of the Appendix.

Defining Direction Priorities

In most cases, users will use a box shaped volume, with a constant weight function. An interface can be provided to the user so that he will align this box with the meaningful directions on the non-deformed object. Changing the size of the box is equivalent to defining $\alpha_x$, $\alpha_y$ and $\alpha_z$ values. As remarked previously the symmetry of the box makes other $\alpha_{ij}$ values vanish.

If the contact volume is almost flat (let's say parallel to the (x,y) plane), then $\alpha z$ vanishes. In this case, the solution corresponds to optimizing the rotation in the (Mx,My) plane, and using the deformed plane normal for rotated z axis: $Rz=Mx \times My/\|Mx \times My\|$.

Figure 4B:
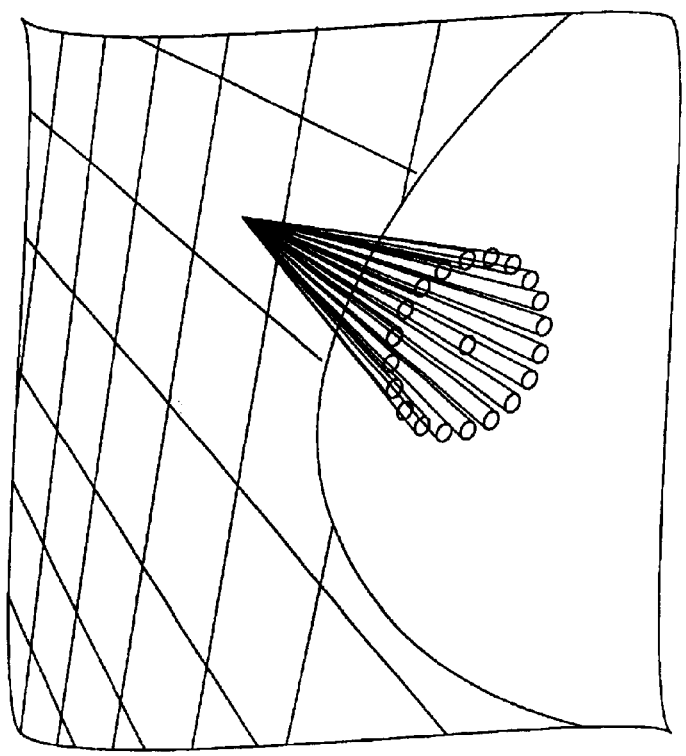
FIG. 4 illustrates an object attached to a deforming model by a selected set of points.
Figure 4A:
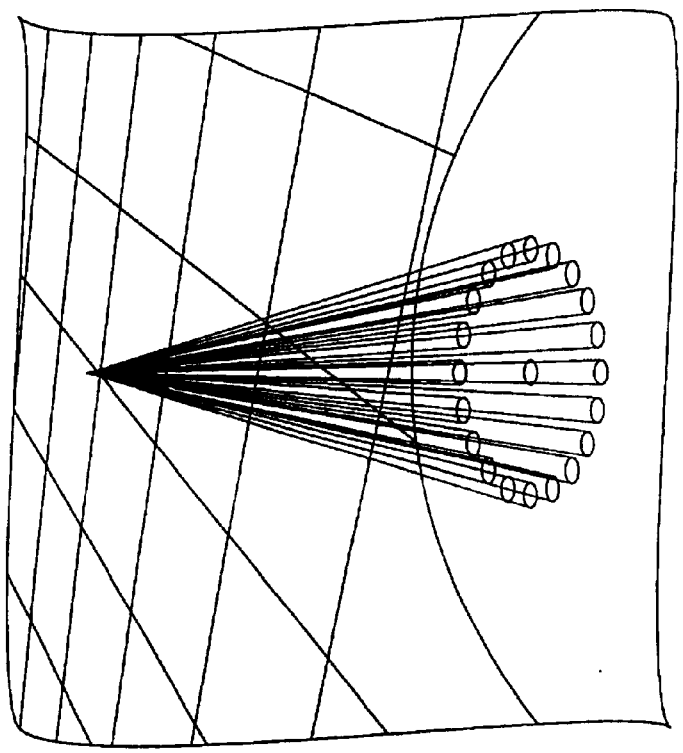

This case can be used if the user wants to pin a button on a piece of cloth, for example. This is a limit situation for the $\alpha$ values, and once again, this method will let the user easily interpolate between this behavior and a more averaged one. FIGS. 4a and 4b are an example where a value corresponding to the undeformed sphere normal was set to zero.

Some deformations, like a shear, will produce a non-orthogonal approximation matrix, thus leading to some average rotation if we use constant weights, whereas the user could expect to keep some direction on the slave object parallel to some deformed vector. In this case, the Gram-Schmidt method seems more appropriate, as it will take in to account the directions in a certain order.

The Gram-Schmidt method produces an orthonormal base $V_i'$ from three $V_i$ deformed vectors, by considering one after the other each sub space generated from the k first vector as shown in equations 22 and 23 of the Appendix.

Figure 5A:
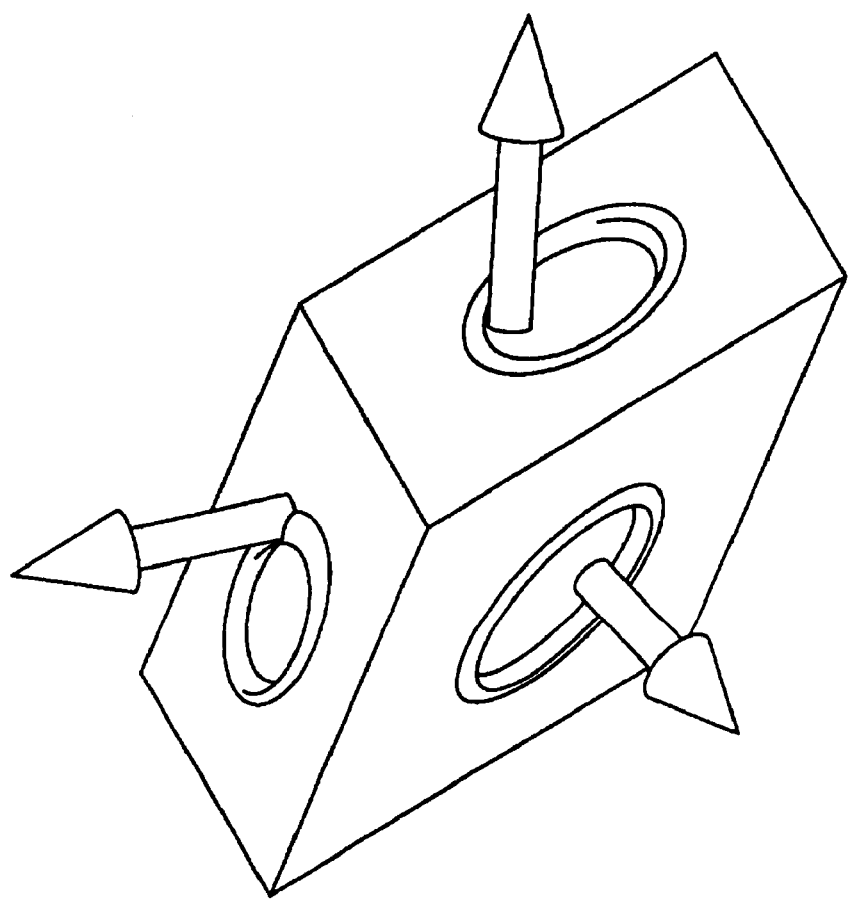
FIGS. 5a–5d show the effect of weights used in the transformation of the invention.
Figure 5B:
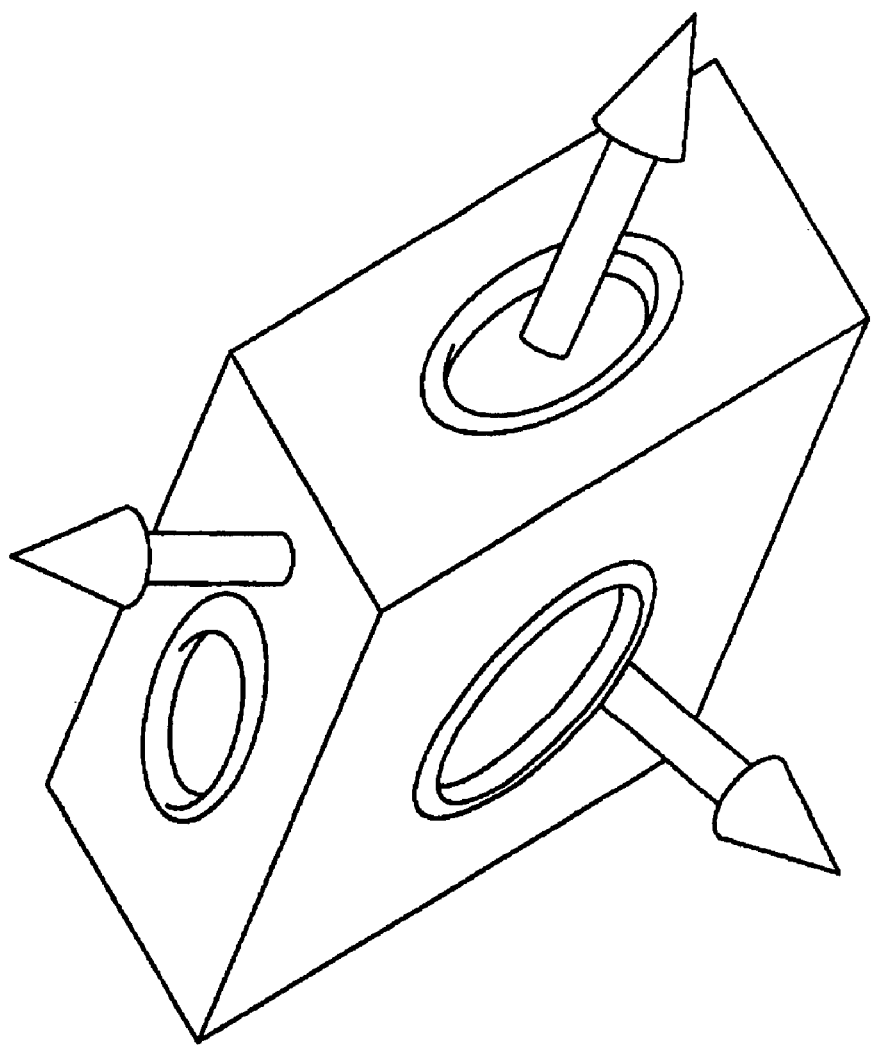
Figure 5C:
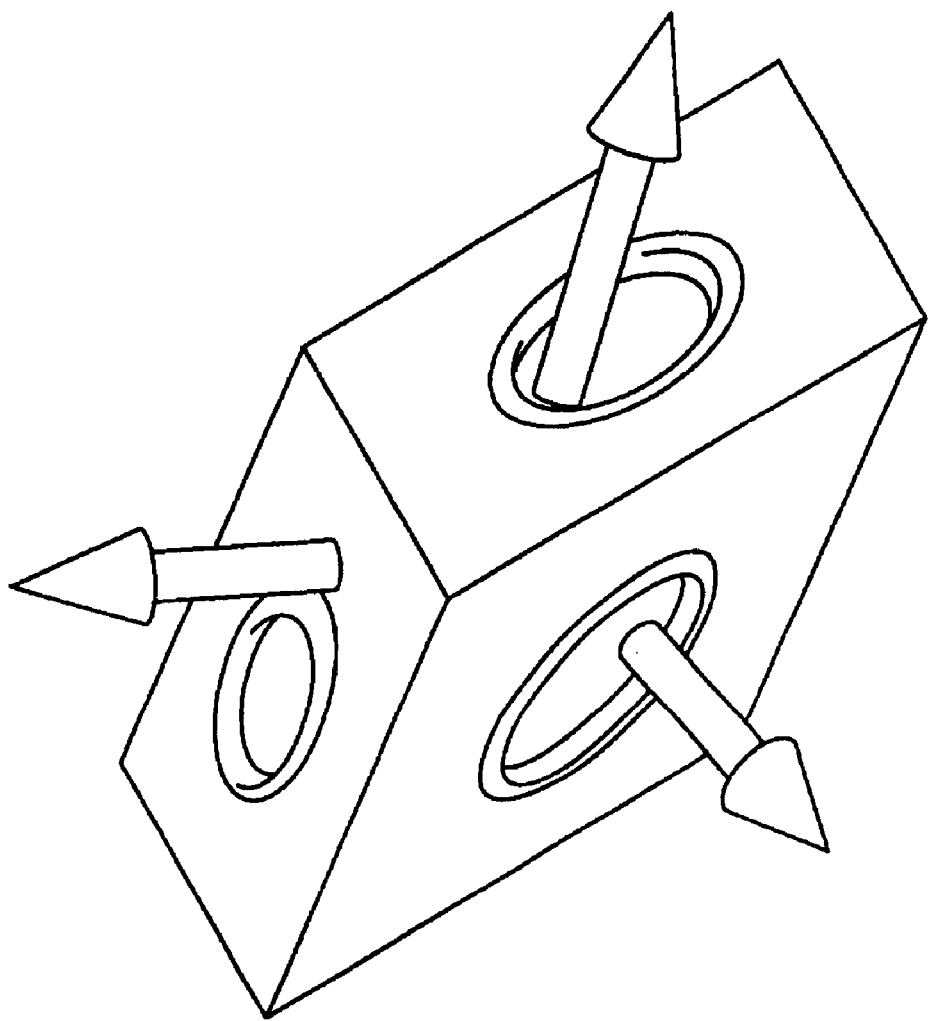
Figure 5D:
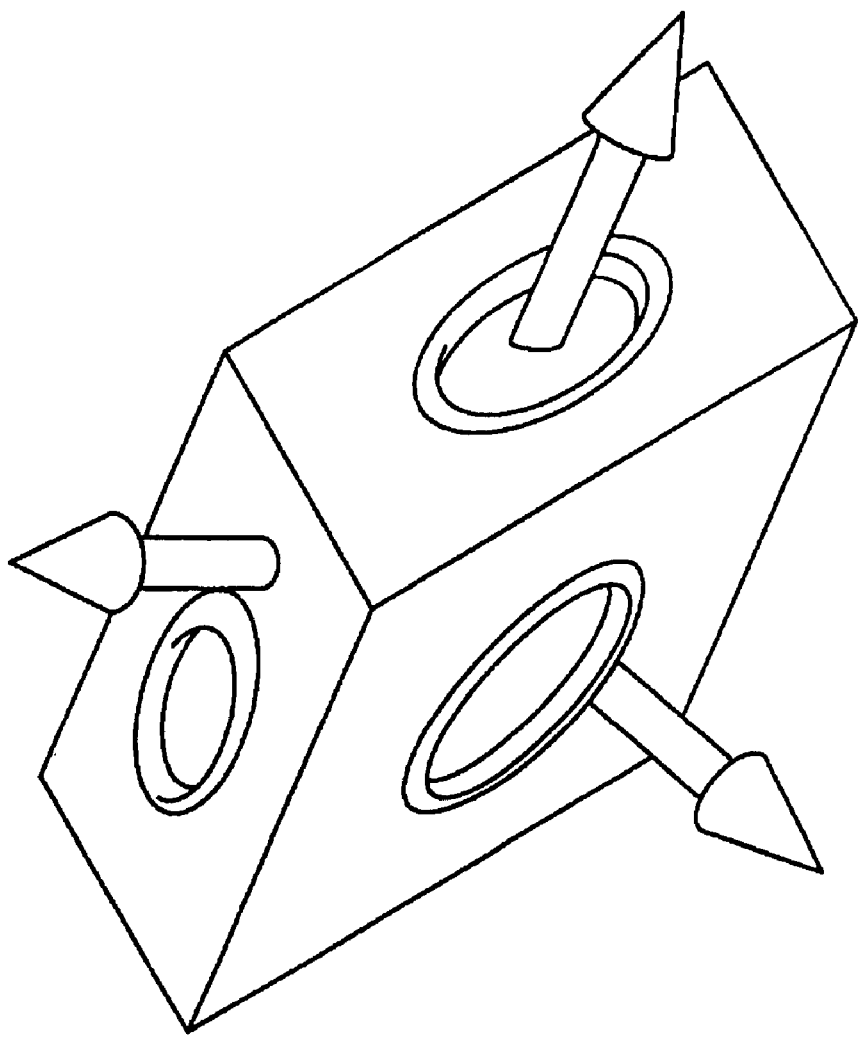

We can see, though, that we can tend to the Gram-Schmidt behavior by using the appropriate box size. A long flat rectangle will achieve the goal: This sets one value to 0, which has the effect of ignoring the corresponding direction. It becomes the last Gram-Schmidt axis. We can then define what is the first one by setting a much higher value than the others. In practice, using 100, 1, 0 as the 3 values gives a result which is visually not distinguishable from the Gram-Schmidt method. This is illustrated in FIGS. 5a–5d. FIG. 5a illustrates the weights $\alpha=(1,1,1)$, FIG. 5b illustrates the Gram-Schmidt solution, FIG. 5c illustrates the weights $\alpha=(4,2,1)$ and FIG. 5d illustrates the weights $\alpha=(100,1,0)$. In this figure, the three arrows represent the rotated x, y and z axis. The inner cube is transformed with a random matrix M. Ellipses are centered on the x, y and z directions transformed by: M, and represent the targets. FIGS. 5d and 5b differ by only a few pixels. The result become numerically identical when $\alpha_x$ reaches 1000.

The method described here includes not only the six Gram-Schmidt cases, but it also gives a way to smoothly interpolate between them by varying the $\alpha$ values.

The algorithm of the inventor can be compared with a more global method as described in E. Raible. Matrix orthogonalization. Graphic gems I, p 464, Academic press Inc, 1990, which does not give more weight to one particular axis. Raible remarks that for any matrix M, $M(M^T M)^{1/2}$ is orthogonal. $(M^T M)^{1/2}$ is computed using the first terms of Taylor series. The method is only valid when M is already close to a rotation matrix, and just produces some approximation. Using the formula proposed herein is direct and does not rely on M being almost a rotation.

Local Linear Approximation of the Deformation

Using the distance described in formula 1, we can look more precisely at the situation where G is a linear transformation using equation 24 of the Appendix.

The first integral does not depend on M, and thus can be ignored in the minimization process. If we consider M to be a vector in $R^9$, the last one is a quadratic form $Q(M)=M^T Q M$, whose coefficients only depend on the metric used: S and w function. It can be expressed with the $\alpha ij$ coefficients in formula 9.

The middle integral is a linear form of $L(M)=-2L \cdot M$, with the result shown in equation 25 of the Appendix.

L is a 3×3 matrix, and L·M the dot product in $R^9$ introduced previously. Minimizing $d_s(F, M)$ is then a straight forward process, involving only Q matrix inversion of equation 26.

Let's use lexicographic numbering to identify 3×3 with $R^9$ vectors: $m_{3i+j}=m_{ij}$. We can compute Q coefficients using $[\delta_{ij}]$ matrices as shown in equation 27.

Q is thus formed of 3×3 blocks, the ones along the diagonal are $[\alpha_{ij}]$ matrices, the other ones are 0. $Q^{-1}$ is made of $[\delta_{ij}]^{-1}$ blocks along the diagonal, which leads to a simpler formula, involving a 3×3 matrix inversion, and a 3×3 matrix product of formula 28.

In practice, it may be difficult to find the $1_{ij}$ values. In some situations the deformation field will only be known at some sample positions. Even if we have some analytical form for F, the integral may be complicated to compute. In those situations, the computation will have to be done numerically using conventional techniques.

Doing accurate computations is probably desirable if the goal is to drive some precise batch process. Nevertheless, for interactive purposes, we can consider some approximations. This can also simplify the proposed user interface. Two simple cases can be implemented which produced intuitive results in most situations.

The first scenario implemented is general enough to solve most situations: users will define the set S as a list of vertices on the deformed geometry (see FIG. 4). This corresponds to replacing the integrals with sums. The examples, always used constant weights, though the user could be provided with a simple paint interface to assign them. This implementation has the benefit of working on all deformed objects, even when the user will manually animate some vertices, not through a deformation field.

The interface can even be simplified, when the deformation is a known deformation field everywhere in space. Users will place a box around the area of interest (the volume S). The deformation is sampled at each vertex of the box, and apply the formula described above. This applies particularly well for combinations of well known non linear deformations like bend, twist, taper, etc.

It should be noted that the $[\alpha_{ij}]$ may not be invertible. This happens for example when the sample points are contained inside a plane. In this case, we can modify the $[\alpha_{ij}]$ matrix to make it invertible. One solution is to diagonalize it, which is possible as it is symmetrical, and then replace the 0 Eigen values, with a small positive number. Another solution is to add additional points off the plane that the user will deform only to define more precisely the rigid attachment.

Performance

In practice, a sampling point method can generally be used in which the number of sampling points is kept relatively low. The user can manually define a set of sample points in the contact set, or automatically pick a predefined number of random positions in the set. Each sample is measured before and after deformation, and each displacement is used as input to the method described here. Real time computation can easily be achieved for 20 points or less.

Computing the best linear approximation requires computing the $1_{ij}$ values, which requires a few floating point operations per sample point, and the inversion of the $[\alpha_{ij}]$ matrix. As $[\alpha_{ij}]$ is generally constant over time (it represents the metric on deformations), the inversion can be done once, and cached for a whole animation sequence.

Computing the rotation from the matrix involves a fixed small number of additions and multiplications, which can be optimized for special $\alpha_{ij}$ values.

The most computing intensive operation is finding the Eigen values of the 4×4 M matrix, which can be solved very efficiently using a conventional Householder reduction, followed by a few operations of the iterative method on the resulting tridiagonal matrix as described in E. Raible, Matrix orthogonalization, Graphic gems I, p 464, Academic press Inc, 1990

In practice less than 4 steps were generally sufficient in test animations. The total computation was always below $\frac{1}{1000}$s on a 180 MHz R5000 OZ workstation. This computation time is at least an order of magnitude less than the computation of the deformation itself. This makes the present invention practical for real time applications, including game engines, where the computing power may be limited. Smooth interpolation between deformed and rigid areas.

When the rigid parts are connected to the deforming object, like limbs of a body, it is generally not acceptable to just use either the deformation algorithm, or the rigid displacement, because this can lead to artifacts at the junction of the two transformation modes. In this case, users can define a fuzzy area where both methods are interpolated. This can be done, for example, by defining a rigidity coefficient in $R^3$ in which a value of 1 means that points are moved with the rigid displacement, and values between 0 and 1 result in and interpolation with the deformation with the rigid displacement. In practice, the user can define a fall off distance outside of the contact set, with, for example, a non linear attenuation curve, or can paint the rigidity on the object using a brush based interface. Rigidity can also be defined using a procedural field, or an analytic formula. Additionally all those methods can be used simultaneously and averaged.

It is acceptable to use a simple interpolation scheme where every point in the transition zone is transformed by the two algorithms, and simply interpolated with a user rigidity factor as described above. Those coefficients, can be applied using a 3D paint system. This gives satisfactory results for simple cases.

A user may experience artifact production problems in certain situations when using the present invention. Several examples will now be discussed where problems can arise along with comments about how to deal with such problems.

When a rigid object is connected to a deformed one, if the size of the rigid object is too large as compared to the deformed area, such as when a button is placed on a cloth in a very wrinkled area. In this situation, the deformation averaged may be from too large an area, which can result in unexpected rotation that may appear almost random. When this circumstance happens the user can reduce the size of the contact set. The problem can also be exaggerated because a small amount of sample points may be used producing aliasing due to too few samples of a high frequency deformation. Providing more sample points will also address this problem. The penetration problem can also be solved by adding feedback forces pushing the deforming object out of the rigid object. For example, in the case of cloth, buttons can be placed for each frame in the location and orientation defined by the algorithm described here. Then, cloth simulation can be rerun locally, with additional forces pushing the cloth away from inside the buttons.

When rigid limbs are attached to bodies, such as when a user selects a few points in the shoulders and neck areas and assigns the arms and head to follow those points. The resulting animation may not be what users would expect. What is typically needed in this situation is extra work to build some refinement into the animation to define the expected behavior. This refinement is generally much easier to control than doing the animation from scratch. In the shoulder example, the arm may move stiffly, in a robot like motion, when this method is used. Users can fix this problem by conventionally defining an additional amount of rotation around the shoulder depending on the story they want to tell. This can be done, for example, with a small amount of additional keys, in a standard key frame system. Without this method, users would generally have to define manually the rotation for almost every frame.

In hierarchical deformations such as when an elbow is present in an arm, the local coordinate system is defined to follow the same transformation as the arm, and the lower part of the arm is constrained to follow the elbow deformation. Such a situation may require that each deformation be modified independently. The overhead is a few matrix multiplications, and this provides a general hierarchical deformation framework, that does not require the usual skeleton definition, and skinning algorithm.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX $$d_S(\mathcal{F}, \mathcal{G}) = \frac{1}{|S|} \int_{P \in S} w(P) \|\mathcal{F}(P) - \mathcal{G}(P)\|^2 dP \tag{1}$$

$$\mathcal{F} \odot \mathcal{G} = \frac{1}{|S|} \int_{P \in S} w(P) \mathcal{F}(P) \cdot \mathcal{G}(P) dP \tag{2}$$

$$C = \frac{1}{|S|} \int_{P \in S} w(P) P dP \tag{3}$$

$$C' = \frac{1}{|S|} \int_{P \in S} w(P) \mathcal{F}(P) dP \tag{4}$$

$$d(\mathcal{F}, t) = \frac{1}{|S|} \int_{P \in S} w(P) \|\mathcal{F}(P) - P - t\|^2 dP \tag{5}$$

$$t \cdot t - 2t \cdot (C' - C) + \frac{1}{|S|} \int_P w(P) \|\mathcal{F}(P) - P\|^2$$

$$d_S(\mathcal{F}, \mathcal{G}) = \frac{1}{|S|} \int_P w(P) \|\mathcal{F}(P) - MP - t\|^2 dP \tag{6}$$

$$= t \cdot t - 2t \cdot C' + 2t \cdot (MC) + k$$

$$d_S(M, R) = \frac{1}{|S|} \int_{P \in S} w(P) \|(M - R)P\|^2 dP \tag{7}$$

$$= \frac{1}{|S|} \int_P w(P) P^T (M - R)^T (M - R) P dP$$

$$[\delta_{ij}] \odot [\delta_{kl}] = \delta_{ik} \frac{1}{|S|} \int_{P \in S} w(P) p_j p_l dP \tag{8}$$

$$\alpha_{ij} = \int_{P \in S} w(P) p_i p_j dP \tag{9}$$

$$M \odot N = \left( \sum_{ij} m_{ij} [\delta_{ij}] \right) \odot \left( \sum_{kl} n_{kl} [\delta_{kl}] \right) \tag{10}$$

$$= \sum_{ijkl} m_{ij} n_{kl} [\delta_{ij}] \odot [\delta_{kl}]$$

$$= \frac{1}{|S|} \sum_{ijl} m_{ij} n_{il} \alpha_{jl}$$

$$= \frac{1}{|S|} \sum_{jl} (m_j \cdot n_l) \alpha_{jl}$$

$$d_S(M, R) = \left( \frac{1}{|S|} \int_{P \in S} x^2 dP \right) \left( \sum_{ij} a_{ij}^2 \right) \tag{11}$$

-continued $$d(M', \mathcal{F}) = (M' - M + M - \mathcal{F}) \odot (M' - M + M - \mathcal{F}) \quad (12)$$
$$= (M' - M)^2 + 2(M' - M) \odot (M - \mathcal{F}) + (M - \mathcal{F})^2$$
$$d(M + \lambda u, \mathcal{F}) = \lambda^2 u \odot u + 2\lambda \alpha + (M - \mathcal{F})^2$$

$$d(M + \lambda u, \mathcal{F}) = (M - \mathcal{F})^2 - \frac{\alpha^2}{u \odot u} \quad (12B)$$

$$d(M + \lambda u, \mathcal{F}) = (M - \mathcal{F})^2 - \alpha^2 \quad (12C)$$

$$\forall R, d(R, \mathcal{F}) = d(R, M) + d(M, \mathcal{F}) \quad (13)$$

$$d(R, M) = M \odot M - 2M \odot R + R \odot R \quad (14)$$
$$= M \odot M - 2M \odot R + \frac{1}{|S|} \sum_i \alpha_{ii}$$

$$\begin{pmatrix} 1 - 2(y^2 + z^2) & 2(xy - wz) & 2(xz + wy) \\ 2(xy + wz) & 1 - 2(x^2 + z^2) & 2(yz - wx) \\ 2(xz - wy) & 2(yz + wx) & 1 - 2(x^2 + y^2) \end{pmatrix} \quad (15)$$

$$\exists \lambda \in \mathbb{R}, \lambda q = \nabla_q (M \odot R(q)) = M \odot \nabla_q R(q) \quad (16)$$

$$\frac{\partial R(q)}{\partial x} = 2 \begin{pmatrix} 0 & y & z \\ y & -2x & -w \\ z & w & -2x \end{pmatrix} \quad (17)$$

$$\frac{\partial R(q)}{\partial y} = 2 \begin{pmatrix} -2y & x & w \\ x & 0 & z \\ -w & z & -2y \end{pmatrix} \quad (18)$$

$$\frac{\partial R(q)}{\partial z} = 2 \begin{pmatrix} -2z & -w & x \\ w & -2z & y \\ x & y & 0 \end{pmatrix} \quad (19)$$

$$\frac{\partial R(q)}{\partial w} = 2 \begin{pmatrix} 0 & -z & y \\ z & 0 & -x \\ -y & x & 0 \end{pmatrix} \quad (20)$$

$$\frac{2}{|S|} \begin{pmatrix} -2(\beta_2^2 + \beta_3^3) & \beta_2^1 + \beta_1^2 & \beta_3^1 + \beta_1^3 & \beta_3^2 - \beta_2^3 \\ \beta_2^1 + \beta_1^2 & -2(\beta_1^1 + \beta_3^3) & \beta_3^2 + \beta_2^3 & \beta_1^3 - \beta_3^1 \\ \beta_3^1 + \beta_1^3 & \beta_3^2 + \beta_2^3 & -2(\beta_1^1 + \beta_2^2) & \beta_2^1 - \beta_1^2 \\ \beta_3^2 - \beta_2^3 & \beta_1^3 - \beta_3^1 & \beta_2^1 - \beta_1^2 & 0 \end{pmatrix} \quad (21)$$

$$\begin{pmatrix} -2(m_{2,2} + m_{3,3}) & m_{1,2} + m_{2,1} & m_{1,3} + m_{3,1} & m_{3,2} - m_{2,3} \\ m_{1,2} + m_{2,1} & -2(m_{1,1} + m_{3,3}) & m_{2,3} + m_{3,2} & m_{1,3} - m_{3,1} \\ m_{1,3} + m_{3,1} & m_{3,2} + m_{2,3} & -2(m_{1,1} + m_{2,2}) & m_{2,1} - m_{1,2} \\ m_{3,2} - m_{2,3} & m_{1,3} - m_{3,1} & m_{2,1} - m_{1,2} & 0 \end{pmatrix} \quad (21A)$$

$$W_0 = V_0, \quad W_i = V_i - \sum_{j<i} (V_i \cdot V_j') V_j' \quad (22)$$

$$V_i' = \frac{W_i}{\|W_i\|} \quad (23)$$

$$|S| d_S(\mathcal{F}, M) = \int_P w(P) \mathcal{F}(P)^2 dP - 2 \int_P w(P) \mathcal{F}(P) \cdot (MP) dP \quad (24)$$
$$+ \int_P w(P)(MP)^2 dP$$

$$l_{ij} = \int_{P \in S} w(P) f_i(P) p_j dP \quad (25)$$

$$M_{\text{min}i} = Q^{-1} L \quad (26)$$

$$q_{3i+j,3k+l} = [\delta_{ij}] \odot [\delta_{kl}] \quad (27)$$
$$= \delta_{ik} \int_{P \in S} w(P) p_j p_l dP$$
$$= \delta_{ik} \alpha_{jl}$$

$$M_{\text{min}i} = [\alpha_{ij}]^{-1} L \quad (28)$$

What is claimed is:

1. A method of attaching a rigid object to a deforming model, comprising:
   finding a linear approximation of a deformation of the model; and
   isotropically finding a rotation and a translation of the object from the deformation allowing attachment of the object to the model.

2. A method as recited in claim 1, wherein the isotropically finding comprises:
   creating a rotation characteristic matrix; and
   extracting Eigen directions from the matrix which correspond to the rotation.

3. A method of attaching a rigid object to a deforming model, comprising:
   finding a linear approximation of a deformation of the model; and
   finding a rotation and a translation of the object from the deformation allowing attachment of the object to the model responsive to a user selected anisotropism.

4. A method as recited in claim 3, wherein the finding a rotation comprises:
   creating a rotation characteristic matrix; and
   extracting Eigen directions from the matrix which correspond to the rotation.

5. A method of attaching a rigid object to a deforming model in an image, comprising:
   assessing a contact region of the object with the model;
   determining a deformation for the contact region;
   producing a position of the object with respect to the model responsive to the deformation; and
   placing the object in the image at the position.

6. A method as recited in claim 5, wherein the position comprises a rotation and a translation.

7. A method as recited in claim 6, wherein the assessing, determining, producing and placing occur for each cycle in an animation of the deforming model.

8. A method as recited in claim 6, wherein the assessing, determining, producing and placing provide continuous non-isotropic control of the rigid object.

9. A method as recited in claim 5, wherein said determining determines an average deformation.

10. A method as recited in claim 9, wherein the producing comprises a linear transformation of the average deformation performing an isotropic removal of shear and scaling.

11. A method as recited in claim 5, wherein the producing rotates the object into the position responsive to an average deformation.

12. A method as recited in claim 5, wherein the assessing, determining, producing and placing occur in real time.

13. A method as recited in claim 5, wherein the contact region comprises a foot print of the object on the model.

14. A method as recited in claim 5, wherein the producing comprises:

creating a rotation characteristic matrix; and extracting Eigen directions from the matrix which correspond to the rotation.

15. A method of attaching a rigid object to a deforming model in an image in an animation, comprising, for each cycle of the animation and in real time:

assessing a contact region of the object with the model the contact region comprising a foot print of the object on the model;

determining an average deformation for the contact region; and producing a position and orientation of the object with respect to the model responsive to the deformation comprising performing a weighted linear transformation of the average deformation, performing an isotropic removal of shear and scaling and rotating the object into the position and orientation responsive to the average deformation; and placing the object in the image at the position and orientation.

16. A system, comprising:

model storage providing a model; and a computer attaching a rigid object to a deforming version of the model in an image by finding a linear approximation of a deformation of the model and isotropically finding a rotation and a translation of the object allowing attachment of the object to the model.

17. A computer readable storage controlling a computer by attaching a rigid object to a deforming model in an image via finding a linear approximation of a deformation of the model and isotropically finding a rotation and a translation of the object allowing attachment of the object to the model.

18. A method of attaching a rigid object to a deformable object that is in a deformed position, comprising:

determining a deformation of the deformable object at a desired point of attachment; and attaching the rigid object to the deformable object at the desired point of attachment responsive to the deformation and allowing the deformable object to be deformed from the deformed position.

* * * * *

UNITED STATES PATENT AND TRADEMARK OFFICE
CERTIFICATE OF CORRECTION

PATENT NO. : 6,525,735 B1
DATED : February 25, 2003
INVENTOR(S) : Jerome Maillot It is certified that error appears in the above-identified patent and that said Letters Patent is hereby corrected as shown below:

Column 5,
Line 60, after "=" insert -- ∝ --
Line 61, after "-" insert -- ∝ --

Column 7,
Line 12, after "one" insert -- ∝ --
Line 25, delete ":"

Signed and Sealed this

Twelfth Day of August, 2003

JAMES E. ROGAN
*Director of the United States Patent and Trademark Office*